United States Patent
Xiao et al.

(10) Patent No.: US 11,829,757 B2
(45) Date of Patent: Nov. 28, 2023

(54) MULTI-LAYER DATA CACHE TO PREVENT USER EXPERIENCE INTERRUPTS DURING FEATURE FLAG MANAGEMENT

(71) Applicant: Brex Inc., Draper, UT (US)

(72) Inventors: Ming Xiao, Mountain View, CA (US); Kingsley Ochu, Edmonton (CA)

(73) Assignee: Brex Inc., Draper, UT (US)

( * ) Notice: Subject to any disclaimer, the term of this patent is extended or adjusted under 35 U.S.C. 154(b) by 142 days.

(21) Appl. No.: 17/564,641

(22) Filed: Dec. 29, 2021

(65) Prior Publication Data

US 2023/0205526 A1 Jun. 29, 2023

(51) Int. Cl.
*G06F 9/30* (2018.01)

(52) U.S. Cl.
CPC ........ *G06F 9/30047* (2013.01); *G06F 9/3005* (2013.01); *G06F 9/30043* (2013.01); *G06F 9/30189* (2013.01)

(58) Field of Classification Search
CPC ............... G06F 9/30047; G06F 9/3005; G06F 9/30189; G06F 9/30043
See application file for complete search history.

(56) References Cited

U.S. PATENT DOCUMENTS

| | | | |
|---|---|---|---|
| 11,102,298 B1 * | 8/2021 | Borowiec | H04L 67/1001 |
| 11,188,313 B1 | 11/2021 | Huffman et al. | |
| 2019/0317887 A1 * | 10/2019 | Wiener | G06F 11/3664 |
| 2019/0386939 A1 | 12/2019 | Christian et al. | |
| 2020/0394679 A1 | 12/2020 | Connolly, Jr. et al. | |
| 2022/0276845 A1 * | 9/2022 | Munoz | G06F 9/30094 |
| 2022/0398078 A1 * | 12/2022 | Segler | G06F 11/3664 |
| 2023/0067057 A1 * | 3/2023 | Verma | G06F 9/5072 |

* cited by examiner

*Primary Examiner* — Mark A Giardino, Jr.
(74) *Attorney, Agent, or Firm* — Haynes and Boone, LLP

(57) ABSTRACT

There are provided systems and methods for a multi-layer cache to prevent user experience interrupts during feature flag management. A service provider may provide applications to computing devices of users including mobile applications. Use and availability of features in an application may be configured using feature flags, however, change of these feature flags may initiate an application refresh that affects user experiences with the application. To prevent interruptions, a multi-layer data cache may be used where feature flag data for the feature flags may initially be loaded, after a time period, to a first layer cache that is not used to update the application. When conditions exist for updating the application without affecting the user experience, such as if the user is no longer using a workflow, the feature flag data may be loaded to a second layer cache. The second layer cache may then be used for updating.

20 Claims, 6 Drawing Sheets

MULTI-LAYER DATA CACHE TO PREVENT USER EXPERIENCE INTERRUPTS DURING FEATURE FLAG MANAGEMENT

TECHNICAL FIELD

The present application generally relates to presentation of new or updated data in user interfaces and more specifically to using a multi-layer cache to update feature flags in user interfaces without interrupting current data processing flows and inputs.

BACKGROUND

Service provider systems may provide services to customer entities, such as businesses and companies, through computing systems and networks. These services may include computing services for digital accounts, credit and underwriting, expense management, and the like. When providing services to entities, different applications, websites, and/or online resources may be used. For example, a mobile application on a mobile device or a resident software application on another computing device may be used to access a service provider's computing services and request data processing, retrieve data, and/or enter data processing flows. Features of an application may be identified, selected, and/or used when activated in the application through feature flags. Conventionally, when service providers modify and/or update feature flags with their online platform, such as with one or more servers and/or databases, those feature flags are automatically updated in the application. This causes a problematic and unwanted user experience (UX) with the application because it may automatically end a user's data processing flow and return to another user interface (UI). Further, data may be lost and/or corrupted when changing between interfaces in an unwanted manner. Currently, solutions to feature flag updating therefore cause poor UX when automatically updating UIs.

Therefore, there is a need to address deficiencies with conventional computing systems that update feature flags, interface elements, and data during application use.

Figure 1:
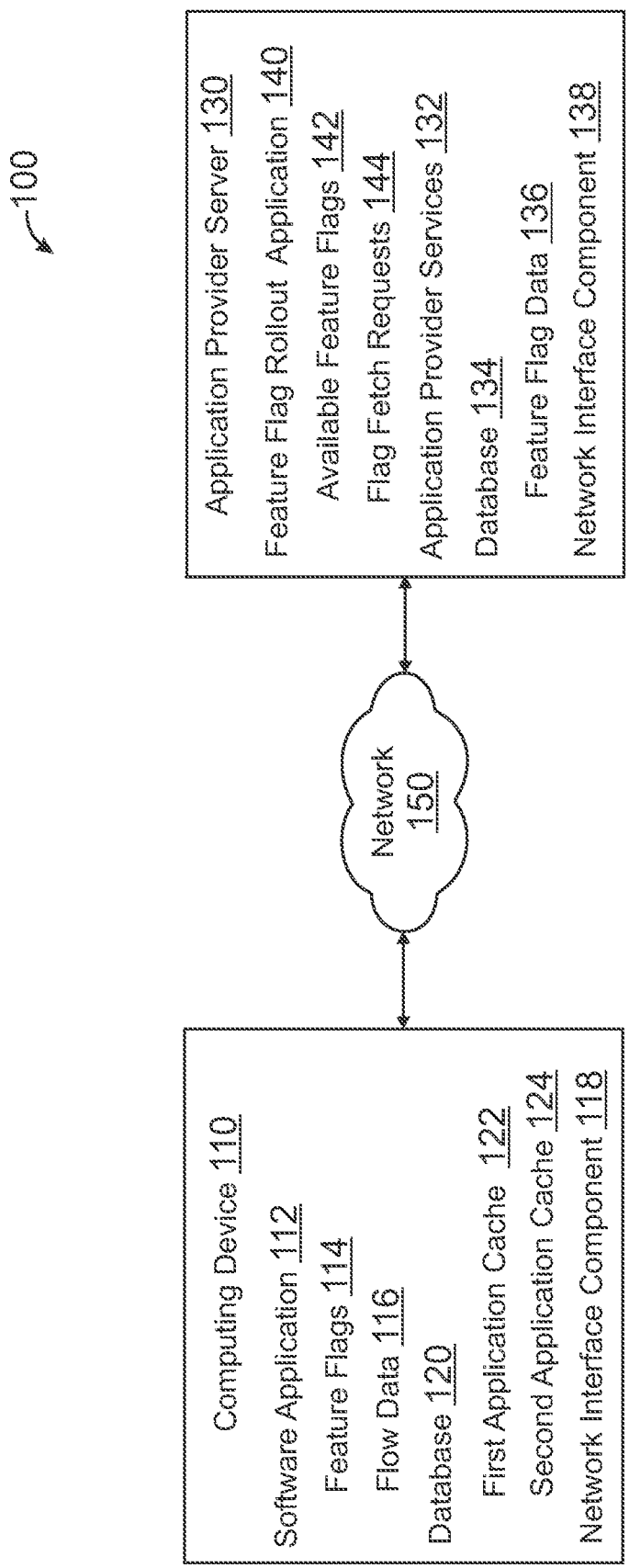
FIG. 1 is a block diagram of a networked system suitable for implementing the processes described herein, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods for a multi-layer cache to prevent user experience interrupts during feature flag management. Systems suitable for practicing methods of the present disclosure are also provided.

In service provider systems, such as credit provider systems and other financial service providers, applications, such as mobile applications and resident software applications, may be used to provide computing services to users. For example, service providers may include underwriting systems utilized to extend credit or other loans to customers and other entities, such as businesses and companies, based on risk assessment and risk analysis processes performed by the service provider systems. The service provider may also provide an account, credit, and/or expense management system that receives and monitors data for an entity, as well as connects with one or more financial computing systems for financial accounts. The service provider may further be utilized for electronic transaction processing, for example, with debit, credit, or other payment card transactions, direct debit/credit through automated clearing house (ACH), wire transfers, gift cards, and other types of funding sources that may be issued to the entity by the service provider and/or other financial service providers (e.g., banks). Thus, a networked system and provider may include a framework and architecture to provide payment gateways, billing platforms, eCommerce platforms, invoicing, and additional services to users, customers, businesses, and/or other entities via applications.

However, applications include different data processing flows and features to access and utilize these computing services of the service provider. These features may be identified, accessed, and utilized through feature flags and corresponding UI elements that identify the features, provide data, and/or initiate one or more data processing flows. When modifying a feature flag, such as to launch a new feature, rollback a problematic feature, update a feature or feature flag, or the like, the service provider may prefer to avoid disrupting users' active workflows and data processing requests, without sacrificing speed on rollout and deployment. Suddenly changing feature flags and other UIs based on changes and updates may lead to a poor UX while the user is actively working and/or interacting with the application. In order to prevent this unwanted UX, the service provider may provide a multi-layer cache that prevents immediate and/or automatic feature flag, UI element, and/or UI updating and changing based on changes and updates to features and feature flags. The changes and updates occur with a backend system or server, where the mobile device or other computing device executing the application is the receiving end of those changes. The multi-layer cache may fetch, after an amount or period of time has expired or passed, feature flag data from one or more servers of the service provider. This feature flag data may then be stored in a first layer application cache (also referred to as a layer one cache) that is persistent or semi-persistent, and only moved to a second layer application cache when it is detected that the user has exited their current task, workflow or data processing flow, and/or interactions with the application. This allows for real-time or near real-time adjustment and updating of applications and UIs without interrupting user interactions and a UX with the application, which allows for better UX using a coordinated system of servers, devices, applications, and data caches.

When providing computing services to users, software applications, such as mobile applications for mobile smart phones, may be used by service providers to provide convenient interfaces to interact with computing services, platforms, and data of the service provider, such as through feature flags for features of the applications. For example, a credit and underwriting provider system may offer services, software, online resources and portals, and infrastructure used to provide underwriting for the entity's (e.g., a business or company) available credit or loans, as well as operations for expenses, purchases, and other financial transactions. Initially, the entity may be onboarded by providing necessary documents to verify the entity's identity and/or business standing, such as incorporation documents, EIN, tax status and/or documents, and the like. In order to be processed for credit underwriting, the entity may further be required to provide certain data regarding the entity's financial status, accounts, and balances, such as initial seed money, investments, and global available balance(s) that may be used for repayment of extended credit or loans. In this regard, the entity may provide access or a link to, such as through an integration with one or more banking systems utilized by the entity, one or more available balances of funds.

Once onboarded for credit and/or payment services, one or more payment instruments may be issued to users or employees of the entity, including sales, management, information technologies, or other users, such as, contractors, affiliates, or owners (hereinafter referred to generally as users or employees). Thus, the service provider may further provide computing services associated with payment instrument creation, management, and the like. The payment instruments may correspond to various types of payment cards and/or account identifiers, which may be issued by the service provider system or by an associated partner (e.g., an issuing bank that provides credit cards or other financial instruments). During the course of business, an employee may engage in commerce with one or more merchants using a payment instrument, such as by making an in-person (e.g., at a merchant location or store) or online purchase from the merchant. Thus, the user may request electronic transaction processing through the account number or payment instrument identifier(s) provided to the user. Merchants (e.g., a seller or payment receiver, such as a business, fundraiser, healthcare provider, landlord, etc.) may correspond to any person or entity selling goods and/or services (referred to herein as an "item" or "items").

The service provider may further provide electronic transaction processing services for processing transactions and/or payments. When processing a payment, the service provider system may receive transaction data for the payment request from the payment network, for example, when the acquirer (e.g., the acquiring bank for the merchant that processes the payment instrument provided by the user) requests processing with the issuer (e.g., the issuing bank of the entity and/or credit provider system that issues the payment instrument). This occurs when the user causes a transaction to be generated, and the merchant generates a total for the transaction request, which the user can pay for by providing a payment instrument to the merchant. After receiving the payment instrument, the merchant may cause a payment request to be generated for payment of the transaction. In various embodiments, the user may be required to enter additional checkout information, such as a name, delivery location, or other personal or financial information that may be included in the transaction data for the transaction. In some cases, the payment instrument may previously be tokenized by the expense management system in order to further protect from fraud, where the digital token allows for backend identification of the payment instrument to the issuer and/or expense management system without exposing payment credentials.

The service provider system may also provide services through an electronic data processing framework that integrates into a payment network and/or computing system of a financial service provider at a point that allows for real-time data acquisition and/or periodic data retrieval and/or updating of available balances for financial accounts of the entity. For example, integration of the framework at a network node or point at or between an issuing and/or acquiring bank for one or more payment networks may allow for data about accounts and balances for an entity to be received in real-time, and thus the framework may perform real-time data processing. The data for financial accounts, balances, and/or transactions may also be acquired at certain intervals, such as from a pull and/or retrieval for the request from the corresponding banking system for the entity. Additionally, the system's framework may integrate with one or more client devices (e.g., personal computers, mobile devices, etc.), online scheduling resources, personnel management systems, and/or enterprise business software to receive data for an entity that is associated with financial accounts, balances, and/or processed transactions. The payment networks may correspond to resolution networks for payment processing using an account identifier, payment card, or the like during electronic and in-person transaction processing. These payment networks and financial service providers (e.g., banks and banking computing systems) may be selected and integrated with in order to determine and process account and/or transaction data.

With such computing systems of service providers, software applications may be provided to provide access to, utilize, request and/or process data, unify computing services, and/or provide other services to users. Applications may correspond to different resident and/or dedicated applications provided by the service provider, such as a mobile application on a mobile smart phone. However, other types of applications may also be provided, such as rich Internet applications, web applications, websites, and the like that may be accessible through different applications including browser applications. Feature flags may correspond to toggles or switches that may allow for providing or removing application feature functionality and/or providing/displaying a UI element selectable to access application features. For example, feature flags may be used to launch new features, rollback other features, or otherwise configure features and deploy those features for the application. In this regard, feature flags may be used to toggle features on or off during deployment, updating, changing, management, or the like, and therefore may be used by an application to configure UI layouts, elements, and the like. The service provider may therefore be required to update feature flags in order to launch a new feature or enable a feature that was disabled during troubleshooting, configuring, and/or updating, as well as rollback or disable problematic features, features that are compromised or abused, during feature updating, and the like When updating feature flags for an application on a computing device, such as for a mobile application on a mobile smart phone of a user, the service provider may implement a multi-cache system and operations for feature flag management. Initially, the user utilizes the computing device and brings the application to a foreground of an operating system (OS) interface of an OS of the computing device. The service provider's computing system, architecture, or server(s) and/or the application may check that feature flag data for the feature flags of the application was fetched from the service provider's server(s), a feature flag vendor's server(s), or other third-party vendor's server(s). In some embodiments, a combination of servers provided by the service provider, feature flag vendor, and the like may also be used during fetching of feature flag data. Once the feature flag data is fetched, the feature flag data may be loaded with the application. Bringing the application to the foreground may include opening and executing the application to use features from the application, or may include bringing a dormant or background application (that may still be active) back to the foreground for further use. If the last fetch time of the feature flag data indicates that an amount of time has not expired, or a threshold time period for fetching the feature flag data has not been met or exceeded (e.g., it has been less than four hours since a last fetch time), no action may be taken.

However, if the last fetch time of the feature flag data indicates that an amount of time has expired, or a threshold time period for fetching the feature flag data has been met or exceeded (e.g., it has been four hours or longer since the last fetch time), then the feature flag data may be fetched by the application of the user's computing device from one or more feature flag servers of the service provider. The fetched feature flag data may be stored in a layer one application cache on the computing device and for the application. The layer one cache may correspond to a persistent or semi-persistent application cache for the application, which may persist after the application closes, is backgrounded, or otherwise is no longer in active usage. The layer one cache may be configured so that stored values and data for feature flags in the first layer cache do not have an effect on the UI, UI elements, and/or features controlled by feature flags in the application. Thus, the feature flag data in the first layer cache may be stored but not used for feature flag updating and/or configuring the application using the feature flags until the application is ready for updating and/or configuring, at which time the feature flag data is moved to a second layer cache and used for updating and/or configuring, as discussed herein.

After caching the feature flag data in the first layer application cache, the user may then background the application in the OS interface and/or OS (e.g., move the application into the background, such as by opening or foregrounding another application, exiting the application, navigating to another UI, or the like). This may occur when the user uses another application, locks or disables the computing device, accesses another component (e.g., a camera), or the like. When the application is backgrounded, the service provider and/or the application may store a first timestamp of a first time when the application was backgrounded. Thereafter, at some later second time, the user may bring the application back into the foreground, such as to further utilize the application. The service provider and/or the application may determine a second timestamp of this second time when the application is again foregrounded.

The service provider and/or application may then compare the two timestamps and determine an amount of time that occurred between the first time/timestamp and the second time/timestamp. If a threshold amount of time (e.g., ten minutes, which may be different than the previous threshold for fetching feature flag data) has not been met or exceeded, then no further action may be taken and the feature flag data may remain in the first layer cache without updating the application's feature flags. This may prevent interrupting current tasks, workflows or data processing flows, and/or interactions. For example, the user may have quickly exited the application to copy data from another application, email, text message, push notification, or the like, or otherwise attend to some short tasks. However, the user may have intended to reenter the application and complete their tasks or workflows.

However, if the amount of time between the first time/timestamp and the second time/timestamp meets or exceeds that threshold, the service provider and/or application may move and/or load the feature flag data from the first layer application cache to a second layer application cache (also referred to as a layer two cache) for the application. The second layer cache may correspond to an in-memory cache for the application that is live while the application is alive. Thus, the second layer cache may be erased/destroyed when the application killed, closed, backgrounded, or otherwise executed. Further, the application may read from the second layer cache instead of the first layer cache so that the second layer cache is used to update the feature flags of the application.

Loading the feature flag data to the second layer cache may trigger a full application refresh. Thus, after loading the feature flag data to the second layer cache, the feature flags for the application are updated using the feature flag data. This may include enabling or disabling application features, data processing flows, workflows, UI elements and features, and the like. Further, during the application refresh, the user may be redirected to and/or land on a home screen or home UI of the application. This may further show new features and/or UI elements. Further, any previous workflow or feature being used by the user may be displayed or highlighted in order to allow the user to navigate to previous features.

In further embodiments, loading of the feature flag data to the second layer application cache from the first layer application cache and/or executing the application refresh from the second layer cache, may be paused or prevented for a length of time or time period. For example, the user may have exited the application for greater than the threshold amount of time (e.g., ten minutes), after which, the application refresh and loading of the feature flag data should be executed. However, the user may be in a data processing flow or other workflow. This may include important workflows or ones labeled high risk or high value, such as payment flows, risk or security, fraud detection, onboarding or account maintenance, and the like. Thus, the feature flag updating and/or changing may be prevented until this flow is completed or exited (e.g., by switching to another feature or UI and exiting the flow). Partial updates not affecting the flow and/or UI may be performed without redirecting the user. When the user has completed the flow or exits the flow, the feature flag data may then be updated.

In this manner, a service provider may provide fast and coordinated updating, changing, and modifying of feature flags through a multi-layer cache system and operations between different servers, computing systems, and data storage caches. This allows for a better UX by preventing changing to UIs and features based on changes to feature flags by servers until application flows are completed or abandonment of those flows is inferred. Thus, technology for providing application updates is improved by utilize the multi-layer cache system and operations herein.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or another suitable device and/or server-based OS. It can be appreciated that the devices and/or servers illustrated in FIG. 1 may be deployed in other ways, and that the operations performed, and/or the services provided by such devices and/or servers may be combined or separated for a given embodiment and may be performed by a greater number or fewer number of devices and/or servers. One or more devices and/or servers may be operated and/or maintained by the same or different entities.

System 100 includes a customer or client's computing device 110 and an application provider server 130 in communication over a network 150. A user (not shown) may correspond to an employee, contractor, shareholder, or other suitable person of a company (not shown and generally referred to herein as an "employee") associated with computing device 110, which may use computing device 110 to access and utilize the computing services of application provider server 130 via a software application 112 on computing device 110. Application provider server 130 may provide feature flag updating without interrupting a UX for those computing services provided via computing device 110 using a multi-layer data cache, as discussed herein.

Computing device 110 and application provider server 130 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 150.

Computing device 110 may be utilized by an employee of an entity or company that employs one or more users, for example, to utilize software application 112 with application provider server 130. For example, in one embodiment, computing device 110 may be implemented as a personal computer (PC), telephonic device, a smart phone, laptop/tablet computer, wristwatch with appropriate computer hardware resources, eyeglasses with appropriate computer hardware (e.g., GOOGLE GLASS®), other type of wearable computing device, implantable communication devices, and/or other types of computing devices capable of transmitting and/or receiving data. In this regard, computing device 110 includes one or more processing applications which may be configured to interact with application provider server 130 via software application 112 for use of computing services, which may be accessible based on features provided or disabled using feature flags. Although only one communication device is shown, a plurality of communication devices may be used and function similarly.

Computing device 110 of FIG. 1 includes software application 112, a database 120, and a network interface component 118. Software application 112 may correspond to executable processes, procedures, and/or applications with associated hardware. In other embodiments, computing device 110 may include additional or different modules having specialized hardware and/or software as required.

Software application 112 may be implemented as specialized hardware and/or software utilized by client device 110 to access and/or utilize services provided by application provider server 130, such as underwriting for credit, onboarding and/or management of an account, electronic transaction processing, and/or usage of other services with application provider server 130 by an entity associated with client device 110 (e.g., an organization, business, company, or the like including startup companies that may require credit services). For example, a user associated with the entity may utilize client device 110 to provide data and/or request data processing for data from application provider server 130. In this regard, software application 112 may correspond to software, hardware, and data utilized by a user associated with client device 110 to enter, store, and process data with application provider server 130, which may include financial and/or transaction data. Such data may be processed via one or more data processing flows, which may utilize computing services provided through application features, UI elements and/or data, and the like. These features in software application 112 may be provided or disabled using one or more of feature flags 114, which may be used to toggle on/off features provided in software application 112 for one or more usages of computing services provided by application provider server 130. In other embodiments, the services may further or instead include email and messaging, social networking, microblogging, media sharing and/or viewing, streaming, and/or other data processing services.

In various embodiments, software application 112 may include a general browser application configured to retrieve, present, and communicate information over the Internet (e.g., utilize resources on the World Wide Web) or a private network. For example, software application 112 may correspond to a web browser, which may send and receive information over network 150, including retrieving website information, presenting the website information to the user, and/or communicating information to the website, including payment information. However, in other embodiments, software application 112 may include a dedicated software application of application provider server 130 or other entity. Software application 112 may be configured to assist in onboarding for accounts, establishing and maintaining the accounts, engaging in electronic transaction processing, and services provided by application provider server 130.

In this regard, features using these computing services may be provided and/or disabled using feature flags 114. Feature flags 114 may be configurable by application provider server 130, using a multi-layer cache. For example, a first application cache 122 and a second application cache 124 associated with database 120 may be used for updating feature flags 114 in order to prevent an unwanted or undesirable UX by refreshing or changing UIs while a user is utilizing computing device 110. When the user is not in a workflow or use of software application 112, feature flags 114 may be updated or changed using first application cache 122 and second application cache 124. Thus, determination of when to execute an update and/or change of one or more of feature flags 114 may be based on an amount of time while software application 112 is closed or backgrounded, as well as flow data 116. For example, a user may only background a software application for a short time while in a workflow associated with flow data 116. In such embodiments, feature flags 114 may not be updated in order to retain flow data 116, such as input provided by a user during the workflow. Conversely, after an amount of time, a use session, and/or workflow for flow data 116, feature flags may then be updated.

Computing device 110 may further include database 120 stored in a transitory and/or non-transitory memory of computing device 110, which may store various applications and data and be utilized during execution of various modules of computing device 110. Thus, database 120 may include, for example, identifiers such as operating system registry entries, cookies associated with software application 112, identifiers associated with hardware of computing device 110, or other appropriate identifiers, such as identifiers used for payment/account/device authentication or identification. Database 120 may include caches and feature flag data for use in updating and/or changing feature flags 114 for software application 112. For example, first application cache 122 may correspond to a permanent or semi-permanent cache that remains after software application 112 is closed or backgrounded, and which initially receives or loads feature flag data for feature flags 114 from application provided server 130. First application cache 122 may not be used to update software application 112 and therefore does not have an effect on UIs, feature flags, features, and the like of software application 112. Conversely, second application cache 124 may correspond to an in-memory cache for software application 112 that only exists while software application 112 is open and/or executing and is destroyed or deleted when closed. Second application cache 124 may be used to update feature flags 114 of software application 112 when loaded with feature flag data from first application cache 122.

Computing device 110 includes at least one network interface component 118 adapted to communicate with application provider server 130 and/or another device or server over network 150. In various embodiments, network interface component 118 may include a DSL (e.g., Digital Subscriber Line) modem, a PSTN (Public Switched Telephone Network) modem, an Ethernet device, a broadband device, a satellite device and/or various other types of wired and/or wireless network communication devices.

Application provider server 130 may be maintained, for example, by an online service provider, which may provide account, payment instruments and credit, expense management, and/or other computing services to companies, businesses, and other entities. In this regard, application provider server 130 includes one or more processing applications which may be configured to interact with computing device 110, and/or other devices or servers to facilitate management of applications and corresponding feature flags using a multi-layer cache on those computing devices or servers. In one example, application provider server 130 may be provided by BREX®, Inc. of San Francisco, Calif., USA. However, in other embodiments, application provider server 130 may be maintained by or include other types of credit providers, financial services providers, feature flag vendors, third parties, and/or other service provider, which may provide applications and computing services to entities. For example, application provider server 130 may correspond to or work in connection with a feature flag vendor, which may manage feature flags for one or more applications and provide feature flag data for fetching.

Application provider server 130 of FIG. 1 includes a feature flag rollout application 140, application provider services 132, a database 134, and a network interface component 138. Feature flag rollout application 140 and application provider services 132 may correspond to executable processes, procedures, and/or applications with associated hardware. In other embodiments, application provider server 130 may include additional or different modules having specialized hardware and/or software as required.

Feature flag rollout application 140 may correspond to specialized hardware and/or software to establish, configure, change, and/or update feature flags for feature provision and disabling in software applications, such as software application 112 on computing device 110 configured to utilize computing services of application provider server 130. In some embodiments, the computing services may be provided by application provider services 132, and may be used to receive payment instruments associated with a bank account, extended credit, and/or funding of the company, such as one or more company credit cards. Application provider services 132 may further provide management for those issued payment instruments and additional funds/accounts of the company, for example, through expense management processes. In this regard, an entity may first establish an account with application provider services 132 by providing company or entity data and onboarding with application provider server 130. The company or entity data may include articles of incorporation, tax status and/or IRS EIN request and confirmation data, and other information that may be utilized to verify a company, business, organization, or charity is proper, valid, and not fraudulent. Such information may further include bank account and funding information, such as verified funding from investors, available funds in a bank or financial account, and the like.

Thus, application provider server 130 may onboard the entity associated with computing device 110 using application provider services 132 for services provided by application provider server 130. This may include providing account and/or expense management services, such as based on expenses and balances available to the entity. Further, credit may be extended to the entity based on entity financial data. In this regard, application provider server 130 and/or another issuing entity may provide a payment instrument that is managed by application provider services 132. For example, application provider server 130 may issue one or more credit cards for employees of the entity, which may correspond to a real or virtual credit card or other types of payment instruments and instrument identifiers that may be used for company payments. Thus, the computing services provided by software applications, websites, and other platforms and online resources may include onboarding for accounts, establishing and maintaining the accounts, engaging in electronic transaction processing, as well as email and messaging, social networking, microblogging, media sharing and/or viewing, streaming, and/or other data processing services.

Feature flag rollout application 140 may further provide operations to deploy, rollout, and/or provide feature flag data 136 to computing devices in order to configure features flags and applications using feature flag data 136. For example, feature flag rollout application 140 may include available feature flags 142, which may correspond to all feature flags that may be used by one or more applications in order to deploy, toggle, or remove features and corresponding feature flags in those applications. One or more application designers, administrators, coders, and/or other users of application provider server 130 may configure features in the application(s), which may correspond to deploying a new feature, rolling back a faulty or corrupt feature, disabling a feature, enabling a disabled feature (e.g., a feature disabled to be fixed, updated, or changed, such as by fixing faulty workflows, adding or deleting workflow, etc.), and the like. Available feature flags 142 may be used by such users to configure feature deployment or disablement, as well as corresponding UI elements and/or presentations in one or more UIs (including home screens).

One or more settings for available feature flags 142 may be generated and stored as feature flag data 136 for managing application feature flags, such as feature flags 114 for software application 112. Feature flag rollout application 140 may create and store feature flag data 136 for fetching/retrieval by, and/or pushing to computing devices including computing device 110. Feature flag rollout application 140 may receive flag fetch requests 144, such as in response to computing device 110 determining that an amount of time has passed or expired since a last time that computing device 110 fetched feature flag data 136 from application provider server 130. In response to receiving flag fetch requests 144 from computing devices, those computing devices may fetch feature flag data 136 and load feature flag data 136 in a first layer application cache in a database or other memory. The computing devices may then utilize feature flag data 136 for updating feature flags when appropriate, which may include preventing or minimizing interrupts in a UX in the corresponding application. For example, feature flag rollout application 140 may receive one of flag fetch requests 144, which may cause feature flag rollout application 140 to have feature flag data 136 loaded to first application cache 122 for database 120. These operations, components, and applications are discussed in further detail with regard to FIGS. 2-4 herein.

Application provider services 132 may correspond to specialized hardware and/or software to allow entities (e.g., the entity associated with computing device 110) to provide account services, process and provide credit or loan extensions, process financial transactions using one or more company credit cards or other financial instruments, and/or provide expense management systems. As previously discussed, application provider services 132 may correspond to one or more services provided by application provider server 130 to an entity, such as the entity associated with computing device 110. In some embodiments, the services may include account and/or credit services. In such embodiments, application provider services 132 may include underwriting systems and models, which may extend credit or other loans based on parameters for an entity. In further embodiments, application provider services 132 may also provide expense management services, such as those that may integrate with an entity's expense, payroll, human resources, business panning, and the like to provide enterprise resource planning (ERP) services.

In some embodiments, application provider services 132 may be used to process transaction data, which may include information about the transaction (e.g., cost, items, additional fees including tax or tip, merchant identifier, description, and the like) and an identifier for the entity associated with computing device 110 and/or the used payment instrument (e.g., credit card number for the credit account). Application provider services 132 may then utilize one or more payment networks to process the transaction, such as by issuing a payment over a payment network and/or by requesting payment by a credit issuing bank or institution to the merchant and/or acquiring bank or institution. In other embodiments, the credit card and payment network may be managed by another entity and/or payment network, where an integration by application provider server 130 with the network may allow for acquisition of transaction data by application provider services 132 in real-time or substantially in real-time. Application provider services 132 may further issue transaction histories and provide accounting and recordation of transaction data, such as with the ERP resources provided by application provider services 132. Access to services and resources provided by application provider services 132 may also be provided, removed, and/or otherwise controlled by feature flag data 136 from database 134. Feature flag data 136 may be accessible and loaded to computing devices for use with a multi-layer cache system for updating feature flags for software applications to configure application features and access to application provider services 132.

Additionally, application provider server 130 includes database 134. As previously discussed, the user, entity, and/or entity corresponding to computing device 110 may establish one or more accounts with application provider server 130. Accounts in database 134 may include customer credit accounts and other entity information, such as name, address, additional user financial information, and/or other desired entity data. Further, database 134 may include feature flag data 136, which may be fetched and/or retrieved by computing device 110, or, in some embodiments, pushed to computing device 110. Feature flag data 136 may include data to configure, add, delete, update, and/or change feature flags for software applications, such as software application 112 on computing device 110. In this regard, feature flag data 136 may be loaded to computing device 110, such as to first application cache 122, by application provider server 130, where first application cache 122 may utilize second application cache 124 for managing, changing, and/or updating feature flags 114 for software application 112.

In various embodiments, application provider server 130 includes at least one network interface component 138 adapted to communicate with computing device 110 and/or other devices or servers over network 150. In various embodiments, network interface component 138 may comprise a DSL (e.g., Digital Subscriber Line) modem, a PSTN (Public Switched Telephone Network) modem, an Ethernet device, a broadband device, a satellite device and/or various other types of wired and/or wireless network communication devices.

Network 150 may be implemented as a single network or a combination of multiple networks. For example, in various embodiments, network 150 may include the Internet or one or more intranets, landline networks, wireless networks, and/or other appropriate types of networks. Network 150 may correspond to small scale communication networks, such as a private or local area network, or a larger scale network, such as a wide area network or the Internet, accessible by the various components of system 100.

Figure 2:
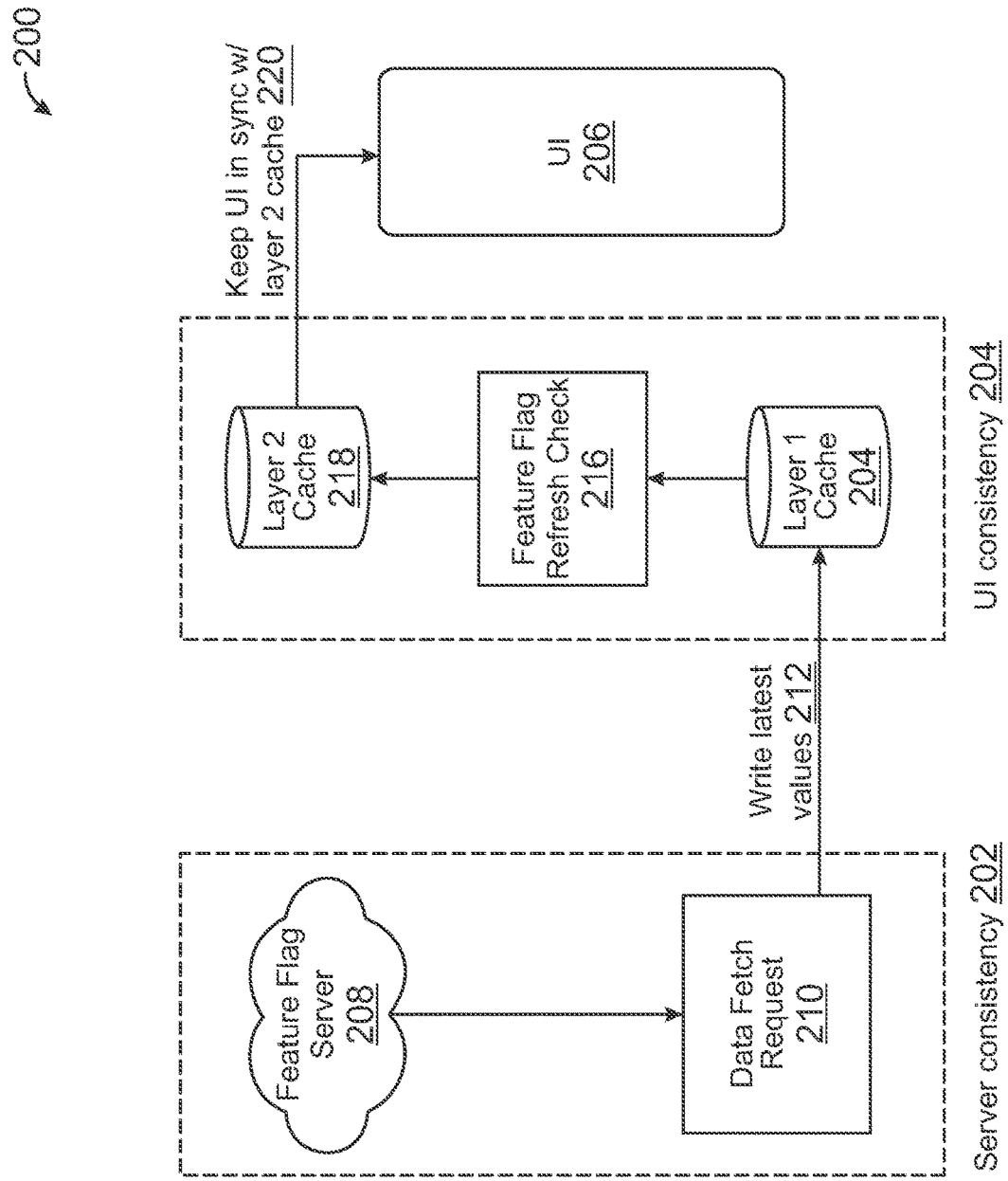
FIG. 2 is an exemplary system architecture for a multi-layer cache that prevents interrupts and user interface changes when updating feature flag data, according to an embodiment.

FIG. 2 is an exemplary system architecture 200 for a multi-layer cache that prevents interrupts and user interface changes when updating feature flag data, according to an embodiment. System architecture 200 includes a server consistency 202 and a UI consistency 204, which may be consistency operations for feature flag management, updating, and/or changing by application provider server 120 and computing device 110, respectively, discussed in reference to system 100 of FIG. 1. A UI 206 may be provided by client device 110, such as through software application 112 when presenting one or more UIs having banners, UI elements, data, and the like presented for features, which may be toggled in UI 206 using feature flags for software application 112. Further, a feature flag server 208 may be provided by application provider server 120 to provide feature flag data that may manage those feature flags for UI 206 and corresponding software application 112.

In this regard, feature flag server 208 initially may be invoked in response to a data fetch request 210 by a computing device corresponding to UI consistency 204. Server consistency 202 and UI consistency 204 may work together in order to ensure application consistency, such as to make application UIs (e.g., feature banners, links, selectable elements, data, etc.) and application features consistent across different instance of the application on different devices and rollout/rollback features, UIs, and UI elements correspondingly. Data fetch request 210 may be received from the corresponding computing device in response to the application being foregrounded and determining that an amount of time since feature flag data and/or settings for feature flags of the computing device has passed or expired, such as a time since last data fetch and the current time meets or exceeds a threshold (e.g., more than X hours, a day, a week, etc., which may be configurable). Feature flag server 208 may include, store, and make available feature flag data for the feature flags of the application across different computing devices, and may response to data fetch request 210 with the data.

In response to data fetch request 210, a data write 212 of the latest values and/or data for the feature flag data is written and stored in a layer one cache 214 (e.g., a first layer application cache). Layer one cache 214 may reside in a memory of the computing device associated with UI consistency 204 and may be a persistent and/or semi-persistent cache, which may remain after the application closes, is backgrounded, or the like. The feature flag data may remain in layer one cache 214 until the application for UI 206 is updated and the UI elements, banners, or the like in UI 206 are updated based on the feature flag data. In this regard, while the application remains in the foreground after the latest values for the feature flag data are written to layer one cache 214, no further action may be taken, and UI 206 may not be updated based on the latest feature flag data and feature flags. This may prevent interrupts during UXs in the application by changing UI 208 and/or redirecting UI 208 due to changes to feature flags.

However, when the application is backgrounded or exited, and then brought back to a foreground of the OS and/or OS interface for the computing device, an amount of time between when the application was backgrounded/exited and the time when the application was brought back to the foreground (which may be a current time where the operations may occur in real-time or near real-time) may be determined by feature flag refresh check 216. This second amount of time may be used by feature flag refresh check 216 to determine whether to load the feature flag data from layer one cache 214 to a layer two cache 218 (e.g., a second layer application cache). No loading from layer one cache 214 to layer two cache 218 may occur when the second amount of time is at or below a threshold amount of time (e.g., ten minutes, one hours, etc., which may be configurable). This may account for where the user using the application and computing device got distracted, had to background/exit the application to retrieve, copy, or view data, attended to a different task, had a system or application error, or the like. The threshold amount of time may be based on various factors including, but not limited to, the type of application, the user, the type of transaction, the location of the device, and the type of update or refresh.

However, if the second amount of time meets or exceeds the threshold amount of time, it may be assumed that the user abandoned the user's current workflow, does not need to complete the user's tasks or interactions in the application, finished previous use of the application, and/or an application update and refresh is required for feature deployment/rollback and consistency. In such embodiments, feature flag refresh check 216 may determine to load the feature flag data from layer one cache 214 to layer two cache 218, which may correspond to an in-memory application cache that is temporary and ended or erased when the application backgrounds, closes, or the like. Once loaded to layer two cache 218, operations of the application and/or feature flag refresh check 216 may execute to perform a UI synchronization 220 where UI 206 is kept in sync with layer two cache 218. This allows for updating of feature flags and UI 206 without or by minimizing interruptions of workflows in the application. Further, feature flag refresh check 216 and/or UI synchronization 220 may pause where the user foregrounds the application back into a workflow and resumes work and may resume when the user completes the workflow or abandons the workflow (e.g., by leaving a data processing flow).

Figure 3A:
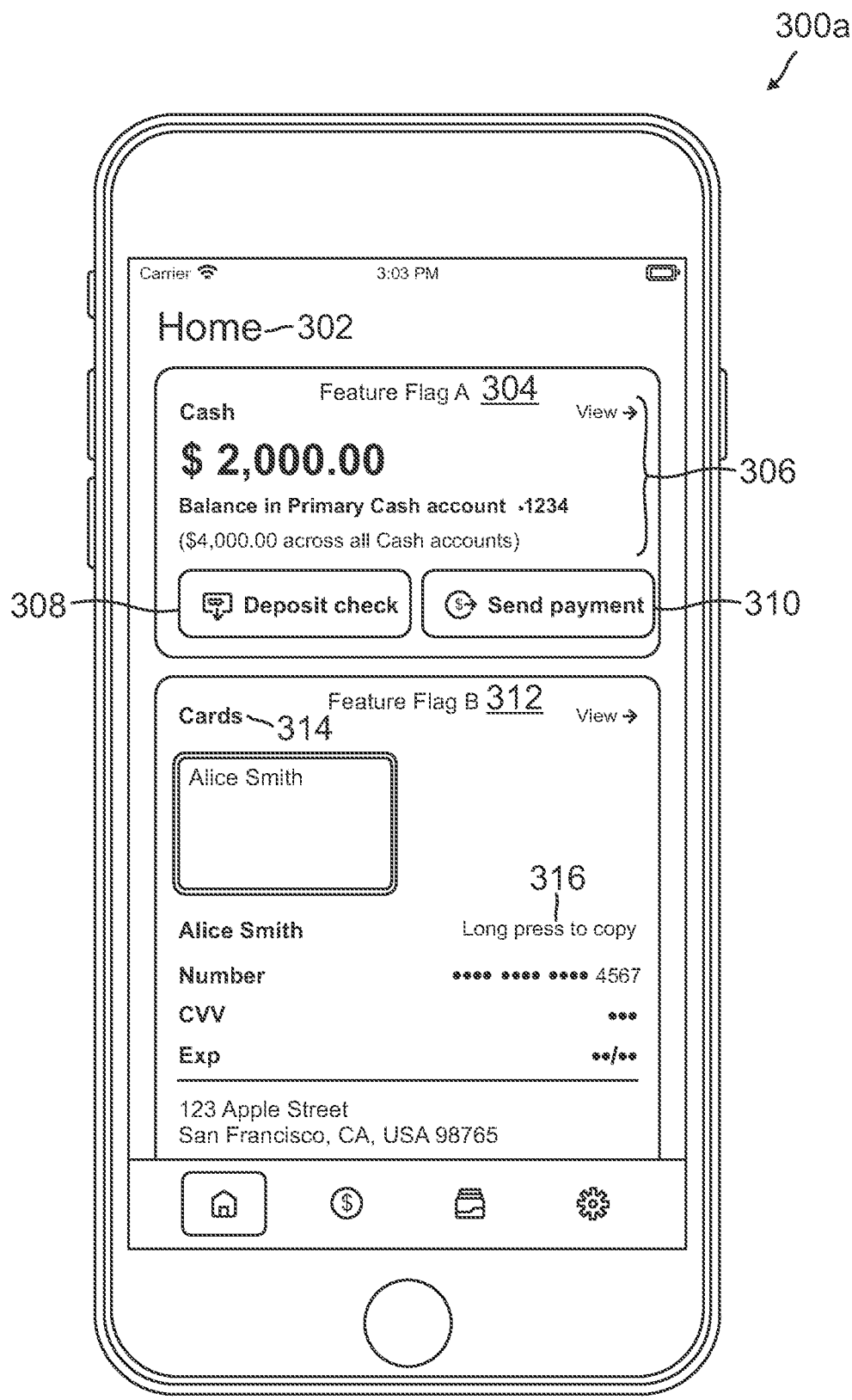
FIGS. 3A and 3B are exemplary user interfaces showing different feature flags after updating using a multi-layer cache, according to an embodiment.
Figure 3B:
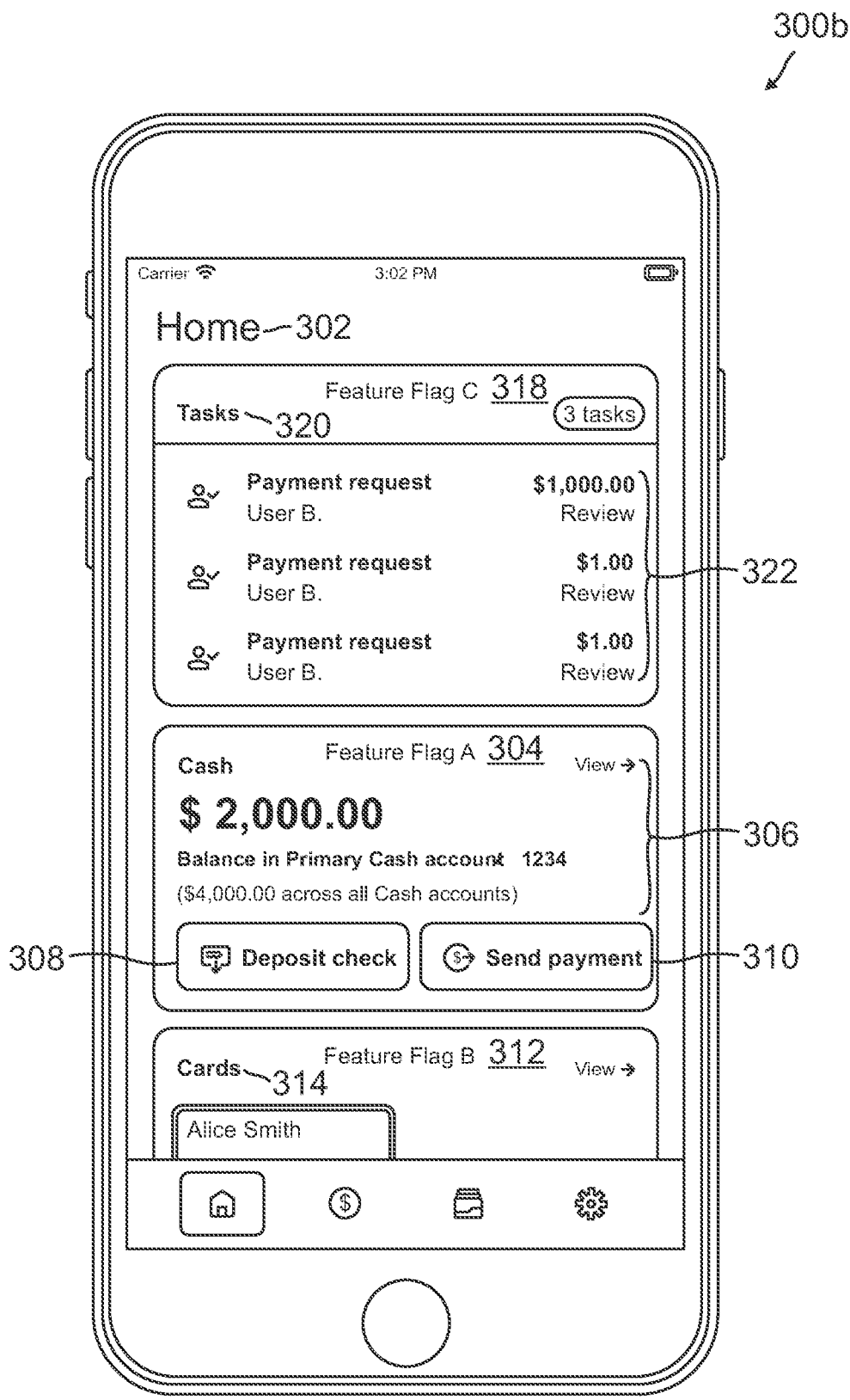

FIGS. 3A and 3B are exemplary user interfaces 300a and 300b showing different feature flags after updating using a multi-layer cache, according to an embodiment. User interfaces 300a and 300b of FIGS. 3A and 3B include displayable banners, selectable options and elements, available data, links, and other UI elements that allow for a user to interact with an application, for example, to use application features that provide computing services from a service provider. In this regard, user interfaces 300a and 300b may be displayed by a computing device via an application, such as by computing device 110 using software application 112 in system 100 of FIG. 1.

For example, computing device 110 may be used to access one or more computing resources and/or services provided by application provider server 130 (e.g., using application provider services 132). This may be used in order to present UIs and UI elements in user interfaces 300a and 300b. In user interface 300a, a home screen 302 is shown with a feature A 304 and a feature B 312. Feature A 304 may display account balances, such as through a balance statement 306, and may further include UI elements for a deposit check option 308 and a send payment option 310. Feature B 312 may correspond to a payment card manager 314, which may include a card data copy option 316 and various card data for one or more payment cards.

However, user interface 300a is missing a feature present in user interface 300b. For example, in user interface 300b, feature A 304 and feature B 312 are present. However, further present at a top of home screen 302 is a feature C 318. Feature C 318 may correspond to a tasks inbox 320, which may be used to manage tasks 322. Tasks 322 in tasks inbox 320 may be used to view payment requests and reminders from other users. In order to present feature C 318 in user interface 300b, a feature flag may be required to be provided and/or toggled on so that feature C 318 is shown as a banner, UI element, and the like in user interface 300b. This feature flag may not be present and/or toggled on (e.g., toggled to an "off" setting) in user interface 300a. In order to provide user interface 300b without interrupting a UX, such as if a user was using one of feature A 304 or feature B 312 and in the middle of a workflow, feature flag data may be loaded and used to update user interface 300a and 300b using the systems, components, applications, and operations for a multi-layer cache provided herein.

Figure 4:
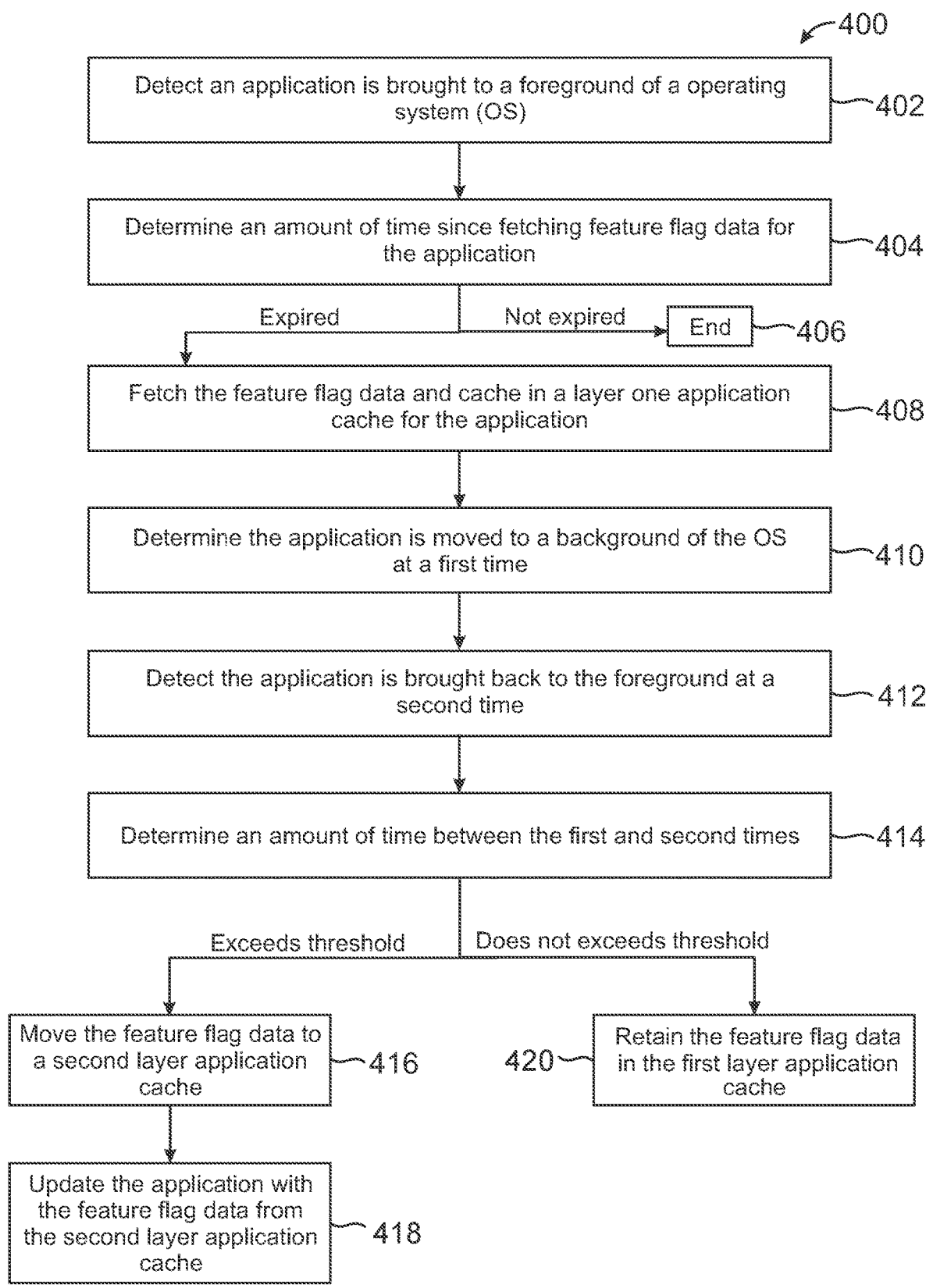
FIG. 4 is an exemplary flowchart for a multi-layer cache to prevent user experience interrupts during feature flag management, according to an embodiment.

FIG. 4 is an exemplary flowchart 400 for a multi-layer cache to prevent user experience interrupts during feature flag management, according to an embodiment. Note that one or more steps, processes, and methods of flowchart 400 described herein may be omitted, performed in a different sequence, or combined as desired or appropriate.

At step 402 of flowchart 400, an application is detected as being brought to a foreground of an OS. This may include opening of the application and/or requesting the application be executed, or may include returning to an application that may have been backgrounded for a period of time while the application, computing device, and/or user was inactive. At step 404, an amount of time since fetching feature flag data for the application is determined. This may correspond to a last time when feature flag data for the application on the computing device was fetched from a server of an application or service provider for the application and loaded to the computing device for configuring and/or updating the feature flags on the computing device.

If the amount of time has not met or exceeded a threshold amount of time (e.g., if four hours, a day, a week, etc., has not passed or expired), then flowchart 400 proceeds to step 406 and ends. Thus, no feature flag data may be fetched and/or downloaded from the server of the application/service provider. However, if the amount of time has met or exceeded the threshold amount of time (e.g., if four hours, a day, a week, etc., has passed or expired), then flowchart 400 proceeds to step 408 where the feature flag data is fetched and cached in a layer one application cache for the application. The feature flag data may be fetched from a feature flag server and/or database of the application/service provider based on being an amount of time since last updating. This assists in ensuring consistency of applications and application features across different devices. The feature flag data may be used to configure feature flags, which may provide, disable, or otherwise configure provision of features, UI elements, and the like within the application.

At step 410, it is determined that the application is moved to a background of the OS at a first time. This may occur when the user of the computing device moves to another application, closes or minimizes the application, locks the computing device, or the like. This may be detected when the application is no longer executing in the foreground and receiving user inputs and interactions. At step 412, it is detected that the application is brought back to the foreground at a second time. This may occur when the user resumes activity in the application, opens or maximizes the application or a window for the application, unlocks the device and accesses the application, or the like. In response to these activities with the application, at step 414, an amount of time between the first and second times is determined. This may correspond to a second amount of time that is compared to a second threshold amount of time to determine whether to update the UI by deploying the feature flag data and/or managing the feature flags for the application using the feature flag data in the first layer application cache for the computing device and application.

If it is determined that the amount of time exceeds the threshold amount of time to update the feature flags of the application using the feature flag data, flowchart 400 proceeds to step 416. At step 416, the feature flag data is moved to a second layer application cache. The feature flag data may therefore be loaded from the first layer application cache to the second layer application cache, where the application reads and updates the application from the second layer application cache. At step 418, the application is updated with the feature flag data from the second layer application cache. The application may therefore change, add, remove, and/or update feature flags for the application and application features using the feature flag data without or minimizing UX interrupts by preventing application updating until the amount of time exceeds the threshold.

In this regard and to avoid the UX interrupts, if it is determined that the amount of time does not exceed the threshold amount of time to update the feature flags of the application using the feature flag data, then flowchart 400 proceeds to step 420. At step 420, the feature flag data is retained in the first layer application cache. Retaining in the first layer application cache, which may be persistent or semi-persistent to remain after application closing, may prevent updating of the application as the application may not read and update from the first layer application cache. Instead, the feature flag data may remain in the first layer application cache until conditions exists to move to the second layer application cache and update the application.

Figure 5:
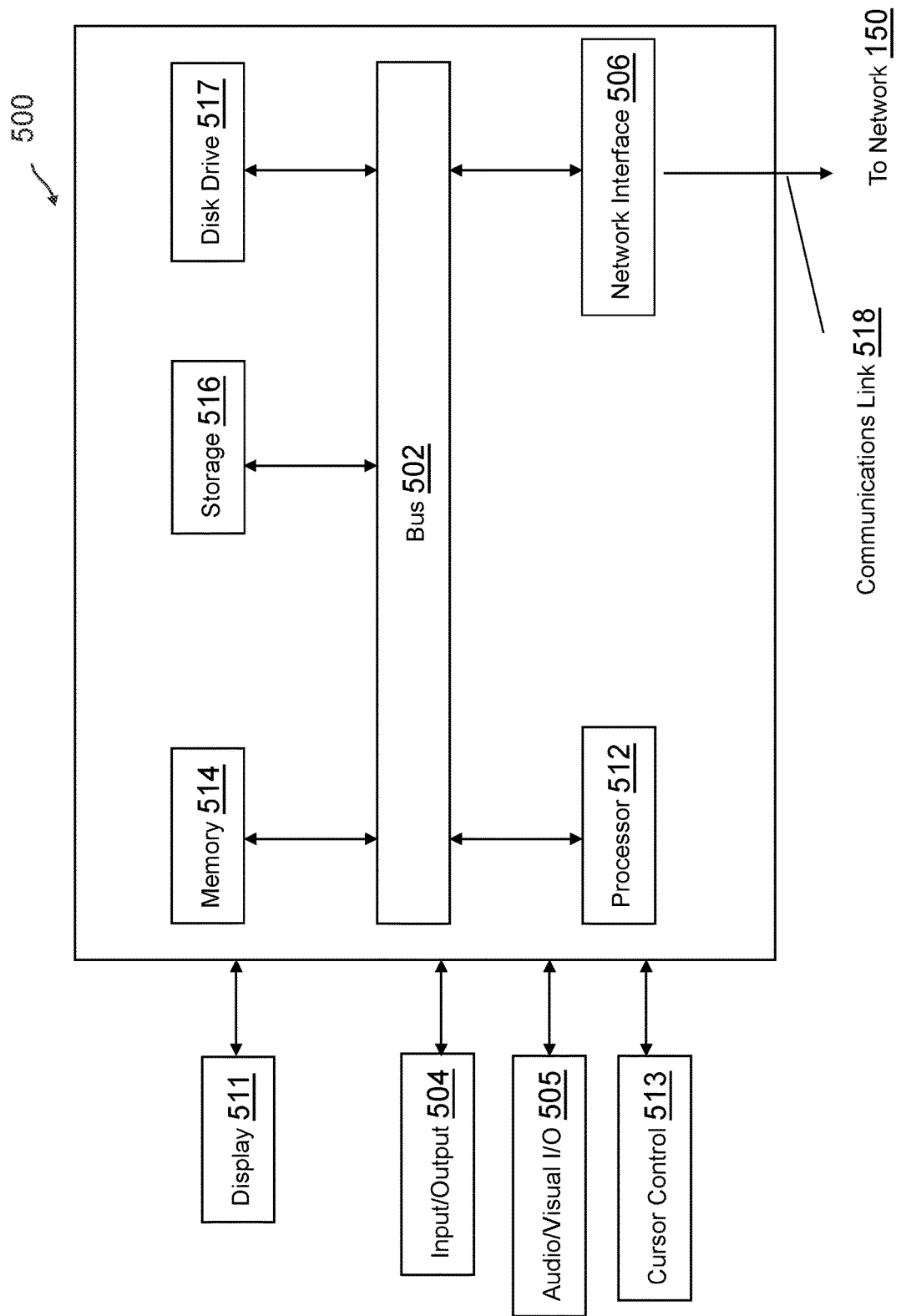
FIG. 5 is a block diagram of a computer system suitable for implementing one or more components in FIG. 1, according to an embodiment.

FIG. 5 is a block diagram of a computer system 500 suitable for implementing one or more components in FIG. 1, according to an embodiment. In various embodiments, the communication device may comprise a personal computing device (e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio/visual input/output (I/O) component 505 may also be included to allow a user to use voice for inputting information by converting audio signals and/or input or record images/videos by capturing visual data of scenes having objects. Audio/visual I/O component 505 may allow the user to hear audio and view images/video including projections of such images/video. A transceiver or network interface 506 transmits and receives signals between computer system 500 and other devices, such as another communication device, service device, or a service provider server via network 150. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A method comprising:
   detecting an application on a computing device being brought to a foreground of an operating system interface of an operating system for the computing device;
   determining that a first amount of time has expired since feature flags for the application were last fetched from a service provider, wherein the feature flags are associated with application features provided through the application on the computing device;
   fetching feature flag data for the feature flags from a computing system of the service provider;
   storing the feature flag data in a first layer application cache for the application on the computing device, wherein the first layer application cache comprises one of a persistent or a semi-persistent cache;
   determining the application being moved to a background of the operating system interface at a first time;
   detecting that the application is brought back to the foreground of the operating system interface at a second time;
   determining a second amount of time between the first time and the second time; and
   determining whether to execute a deployment of the feature flag data based on the second amount of time, wherein the deployment utilizes a second layer application cache for the application on the computing device.

2. The method of claim 1, wherein the second amount of time meets or exceeds a threshold amount of time and the determining whether to execute the deployment comprises determining to execute the deployment, and wherein the method further comprises:
   loading the feature flag data from the first layer application cache to the second layer application cache;
   performing a refresh of the feature flags with the application for the application features using the feature flag data from the second layer application cache; and
   refreshing the application to a home screen interface of the application.

3. The method of claim 2, wherein the performing the refresh of the feature flags is paused if the application is performing a data processing flow.

4. The method of claim 3, wherein the performing the refresh is resumed when the data processing flow is one of completed or exited.

5. The method of claim 1, wherein the second amount of time is below or at a threshold amount of time and the determining whether to execute the deployment comprises determining not to execute the deployment, and wherein the method further comprises:
   retaining the feature flag data in the first layer application cache independent of the second layer application cache.

6. The method of claim 1, wherein the determining whether to execute the deployment of the feature flag data is further based on whether the application is in a data processing flow for one of the application features of the application.

7. The method of claim 6, wherein the determining whether to execute the deployment of the feature flag data based on the second amount of time comprises determining whether the second amount of time meets or exceeds a threshold amount of time while the application is in the data processing flow indicating an abandonment of the data processing flow.

8. The method of claim 1, wherein the second layer application cache is configured to update the feature flags using the feature flag data independent of a use of the first layer application cache for updating the feature flags.

9. The method of claim 1, wherein the feature flags are associated with at least one of feature banners, data processing flows, operations for data processing requests, or presentation of data in the application.

10. A computing device system comprising:
    a non-transitory memory; and one or more hardware processors coupled to the non-transitory memory and configured to read instructions from the non-transitory memory to cause the computing device system to perform operations comprising:
   detecting an application on the computing device system being brought to a foreground of an operating system interface of an operating system for the computing device system;
   determining that a first amount of time since feature flags for the application were last fetched from a service provider meets or exceeds a threshold amount of time, wherein the feature flags are associated with application features provided through the application on the computing device system;
   fetching feature flag data for the feature flags from an online computing platform of the service provider;
   storing the feature flag data in a first layer application cache for the application on the computing device system;
   determining the application being moved to a background of the operating system interface at a first time;
   detecting that the application is brought back to the foreground of the operating system interface at a second time;
   determining a second amount of time between the first time and the second time; and
   determining whether to execute a deployment of the one or more feature flags based on the second amount of time, wherein the deployment utilizes a second layer application cache for the application on the computing device system.

11. The computing device system of claim 10, wherein the second amount of time meets or exceeds a threshold amount of time and the determining whether to execute the deployment comprises determining to execute the deployment, and wherein the operations further comprise:
   loading the feature flag data from the first layer application cache to the second layer application cache;
   performing a refresh of the feature flags with the application for the application features using the feature flag data from the second layer application cache; and
   refreshing the application to a home screen interface of the application.

12. The computing device system of claim 11, wherein the performing the refresh of the feature flags is paused if the application is performing a data processing flow.

13. The computing device system of claim 12, wherein the performing the refresh is resumed when the data processing flow is one of completed or exited.

14. The computing device system of claim 10, wherein the second amount of time is below or at a threshold amount of time and the determining whether to execute the deployment comprises determining not to execute the deployment, and wherein the operations further comprise:
   retaining the feature flag data in the first layer application cache independent of the second layer application cache.

15. The computing device system of claim 10, wherein the determining whether to execute the deployment of the feature flag data is further based on whether the application is in a data processing flow for one of the application features of the application.

16. The computing device system of claim 15, wherein the determining whether to execute the deployment of the feature flag data based on the second amount of time comprises determining whether the second amount of time meets or exceeds a threshold amount of time while the application is in the data processing flow indicating an abandonment of the data processing flow.

17. The computing device system of claim 10, wherein the second layer application cache is configured to update the feature flags using the feature flag data independent of a use of the first layer application cache for updating the feature flags, wherein the first layer application cache comprises one of a persistent or a semi-persistent cache, and wherein the second layer application cache comprises an in-memory cache.

18. The computing device system of claim 10, wherein the feature flags are associated with at least one of feature banners, data processing flows, operations for data processing requests, or presentation of data in the application.

19. The computing device system of claim 10, wherein the computing device system comprises a mobile smart phone, and wherein the application comprises a mobile application provided by the service provider.

20. A non-transitory machine-readable medium having stored thereon machine-readable instructions executable to cause a machine to perform operations comprising:
   detecting an application on a computing device being brought to a foreground of an operating system interface of an operating system for the computing device;
   determining that a first amount of time has expired since feature flags for the application were last fetched from a service provider, wherein the feature flags are associated with application features provided through the application on the computing device;
   fetching feature flag data for the feature flags from a computing system of the service provider;
   storing the feature flag data in a first layer application cache for the application on the computing device, wherein the first layer application cache comprises one of a persistent or a semi-persistent cache;
   determining the application being moved to a background of the operating system interface at a first time;
   detecting that the application is brought back to the foreground of the operating system interface at a second time;
   determining a second amount of time between the first time and the second time; and
   determining whether to execute a deployment of the one or more feature flags based on the second amount of time, wherein the deployment utilizes a second layer application cache for the application on the computing device.

\* \* \* \* \*